United States Patent [19]

Gjertsen

[11] 4,381,284
[45] Apr. 26, 1983

[54] FUEL ASSEMBLY FOR A NUCLEAR REACTOR

[75] Inventor: Robert K. Gjertsen, Monroeville, Pa.

[73] Assignee: Westinghouse Electric Corp., Pittsburgh, Pa.

[21] Appl. No.: 217,059

[22] Filed: Dec. 16, 1980

[51] Int. Cl.³ .............................................. F16L 15/00
[52] U.S. Cl. ..................................... 376/364; 376/446
[58] Field of Search ............... 376/364, 362, 353, 456, 376/440, 433, 449, 363

[56] References Cited

U.S. PATENT DOCUMENTS

| 3,164,530 | 1/1965 | Banks . | |
|---|---|---|---|
| 3,205,144 | 9/1965 | Jabsen . | |
| 3,549,491 | 12/1970 | Johnson . | |
| 3,853,703 | 12/1974 | Anthony et al. . | |
| 3,953,287 | 4/1976 | Long et al. . | |
| 3,971,575 | 7/1976 | Lesham et al. | 376/364 |
| 4,064,004 | 12/1977 | Long et al. . | |
| 4,076,586 | 2/1978 | Bideau et al. | 376/364 |
| 4,240,874 | 12/1980 | Millot . | |
| 4,298,434 | 11/1981 | Anthony et al. | 376/364 |

Primary Examiner—Harvey E. Behrend
Attorney, Agent, or Firm—L. A. DePaul; Z. L. Dermer

[57] ABSTRACT

A fuel assembly in a nuclear reactor comprises a locking mechanism that is capable of locking the fuel assembly to the core plate of a nuclear reactor to prevent inadvertent movement of the fuel assembly. The locking mechanism comprises a ratchet mechanism that allows the fuel assembly to be easily locked to the core plate but prevents unlocking except when the ratchet is disengaged.

10 Claims, 12 Drawing Figures

FUEL ASSEMBLY FOR A NUCLEAR REACTOR

CROSS-REFERENCE TO RELATED APPLICATIONS

This application is related to copending applications Ser. No. 217,060 entitled "Mechanical Spectral Shift Reactor" by W. J. Dollard et al.; Ser. No. 217,056 entitled "Latching Mechanism" by L. Veronesi; Ser. No. 217,054 entitled "Spectral Shift Reactor Control Method" by A. J. Impink, Jr.; Ser. No. 217,061 entitled "Spectral Shift Reactor" by W. R. Carlson et al.; Ser. No. 217,052 entitled "Displacer Rod For Use In A Mechanical Spectral Shift Reactor" by R. K. Gjertsen et al.; Ser. No. 217,053 entitled "Mechanical Spectral Shift Reactor" by D. G. Sherwood et al.; Ser. No. 217,275 entitled "Mechanical Spectral Shift Reactor" by J. F. Wilson et al.; Ser. No. 217,055 entitled "Hydraulic Drive Mechanism" by L. Veronesi et al.; and Ser. No. 217,051 entitled "Fuel Assembly For A Nuclear Reactor" by R. K. Gjertsen et al. all of which are filed Dec. 16, 1980 and to Ser. No. 228,007 entitled "Self-Rupturing Gas Moderator Rod For A Nuclear Reactor" by G. R. Marlatt, filed Jan. 23, 1981 all of which are assigned to the Westinghouse Electric Corporation.

BACKGROUND OF THE INVENTION

The invention relates to fuel assemblies for nuclear reactors and more particularly to fuel assemblies having integral latching mechanisms.

In typical nuclear reactors, reactivity control is accomplished by varying the amount of neutron absorbing material (poisons) in the reactor core. Generally, neutron absorbing control rods are utilized to perform this function by varying the number and location of the control rods with respect to the reactor core. In addition to control rods, burnable poisons and poisons dissolved in the reactor coolant can be used to control reactivity.

In the conventional designs of pressurized water reactors, an excessive amount of reactivity is designed into the reactor core at start-up so that as the reactivity is depleted over the life of the core the excess reactivity may be employed to lengthen the core life. Since an excessive amount of reactivity is designed into the reactor core at the beginning of core life, neutron absorbing material such as soluble boron must be placed in the core at that time in order to properly control the excess reactivity. Over the core life, as reactivity is consumed, the neutron absorbing material is gradually removed from the reactor core so that the original excess reactivity may be used. While this arrangement provides one means of controlling a nuclear reactor over an extended core life, the neutron absorbing material used during core life absorbs neutrons and removes reactivity from the reactor core that could otherwise be used in a more productive manner such as in plutonium fuel production. The consumption of reactivity in this manner without producing a useful product results in a less efficient depletion of uranium and greater fuel costs than could otherwise be achieved. Therefore, it would be advantageous to be able to extend the life of the reactor core without suppressing excess reactivity with neutron absorbing material thereby providing an extended core life with a significantly lower fuel cost.

One such method of producing an extended core life while reducing the amount of neutron absorbing material in the reactor core is by the use of "Spectral Shift Control". As is well understood in the art, in one such method the reduction of excess reactivity (and thus neutron absorbing material) is achieved by replacing a large portion of the ordinary reactor coolant water with heavy water. This retards the chain reaction by shifting the neutron spectrum to higher energizes and permits the reactor to operate at full power with reduced neutron absorbing material. This shift in the neutron spectrum to a "hardened" spectrum also causes more of the $U^{238}$ to be converted to plutonium that is eventually used to produce heat. Thus, the shift from a "soft" to a "hard" spectrum results in more neutrons being consumed by $U^{238}$ in a useful manner rather than by poisons. As reactivity is consumed, the heavy water is gradually replaced with ordinary water so that the reactor core reactivity is maintained at a proper level. By the end of core life, essentially all the heavy water has been replaced by ordinary water while the core reactivity has been maintained. Thus, the reactor can be controlled without the use of neutron absorbing material and without the use of excess reactivity at start-up which results in a significant uranium fuel cost savings. The additional plutonium production also reduces the $U^{235}$ enrichment requirements. While the use of heavy water as a substitute for ordinary water can be used to effect the "spectral shift", the use of heavy water can be an expensive and complicated procedure.

While there exist in the prior art numerous ways of controlling a nuclear reactor, what is needed is a fuel assembly for use in controlling neutron moderation in a manner that provides for reduced uranium fuel costs and for an extended reactor core life.

SUMMARY OF THE INVENTION

A fuel assembly in a nuclear reactor comprises a locking mechanism that is capable of locking the fuel assembly to the core plate of a nuclear reactor to prevent inadvertent movement of the fuel assembly. The locking mechanism comprises a ratchet mechanism that allows the fuel assembly to be easily locked to the core plate but prevents unlocking except when the ratchet is disengaged.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

In the operation of a commercial pressurized water reactor it is desirable to be able to selectively prevent movement of the fuel assemblies in the reactor core. The invention described herein provides a fuel assembly capable of being locked to the core plate of a nuclear reactor to prevent movement of the fuel assembly during reactor operation.

Figure 1:
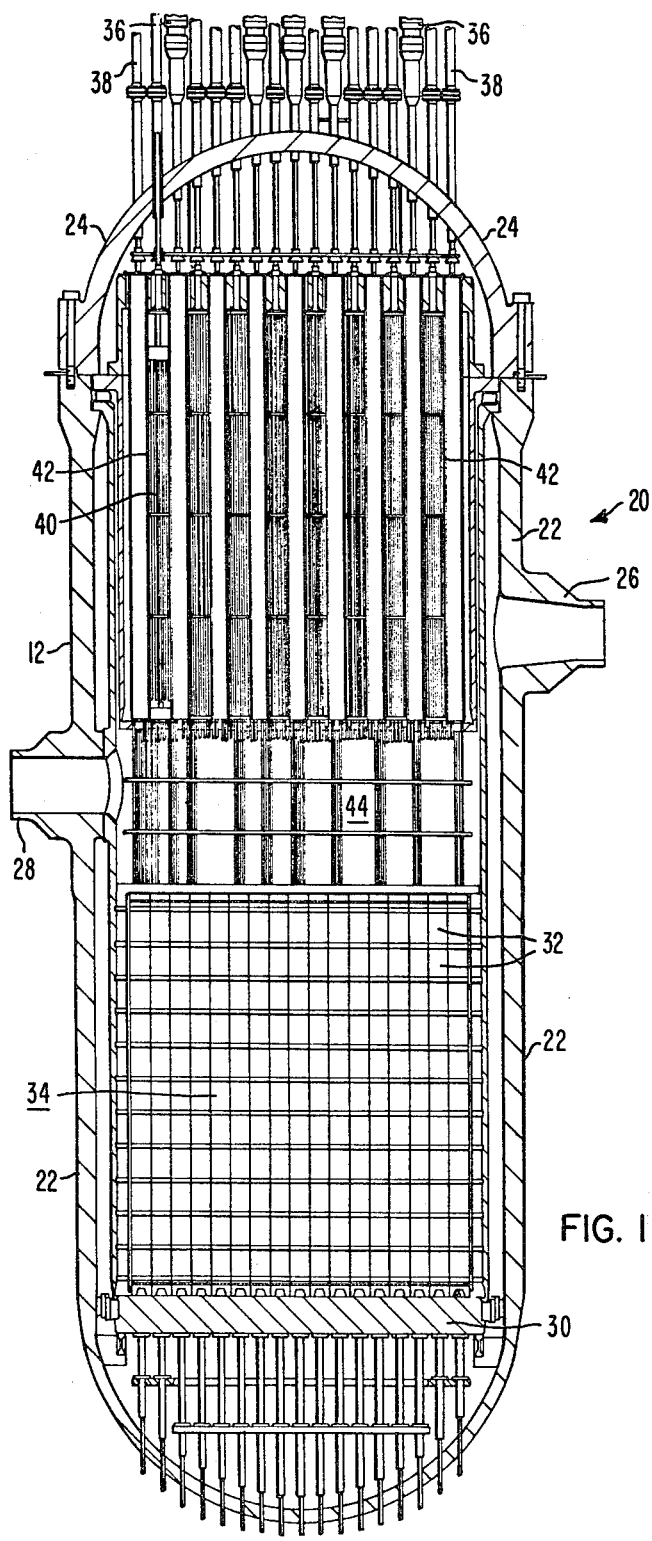
FIG. 1 is a cross-sectional view in elevation of the reactor vessel.
Figure 2:
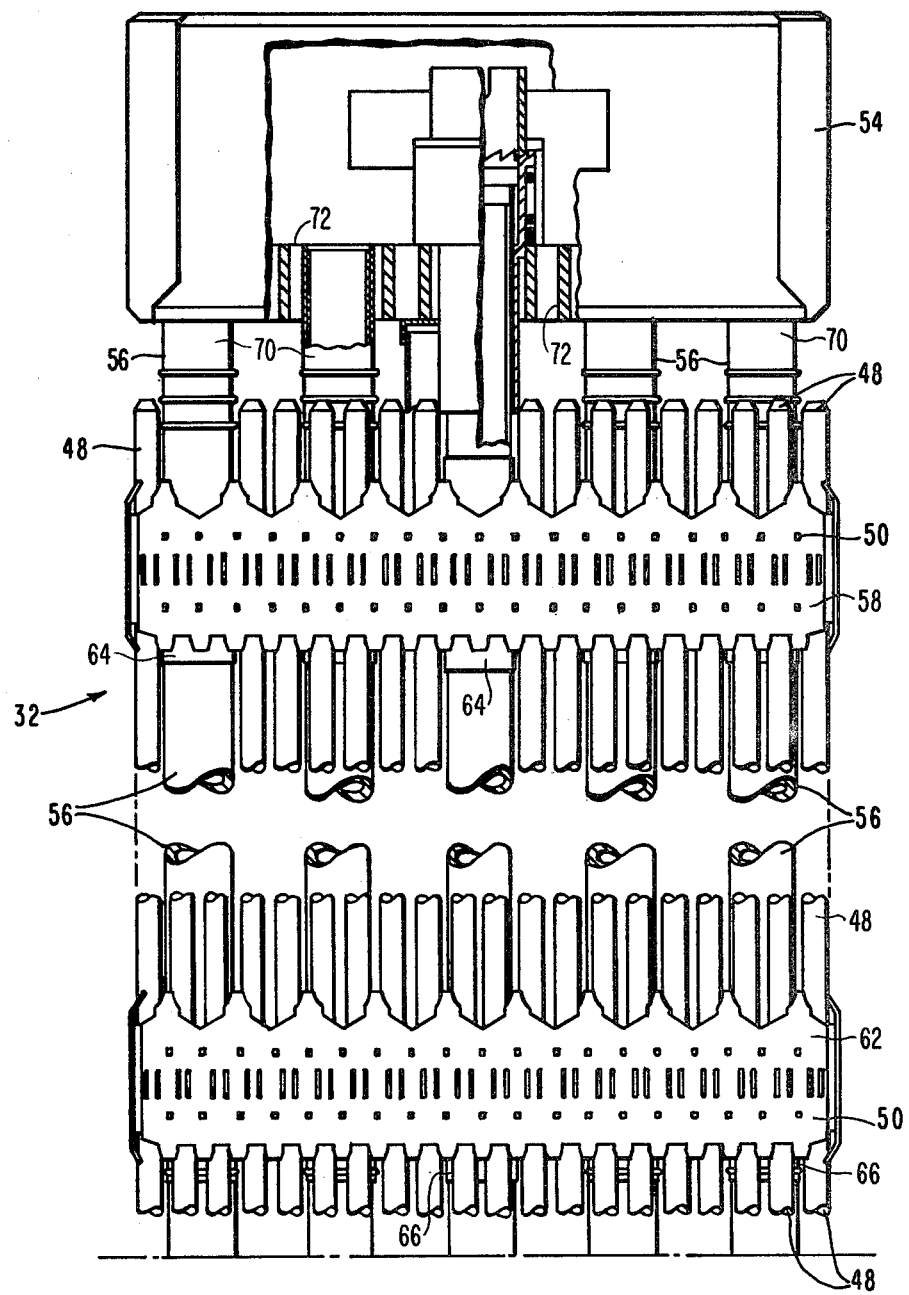
FIG. 2 is a cross-sectional view in elevation of the top portion of the fuel assembly.
Figure 3:
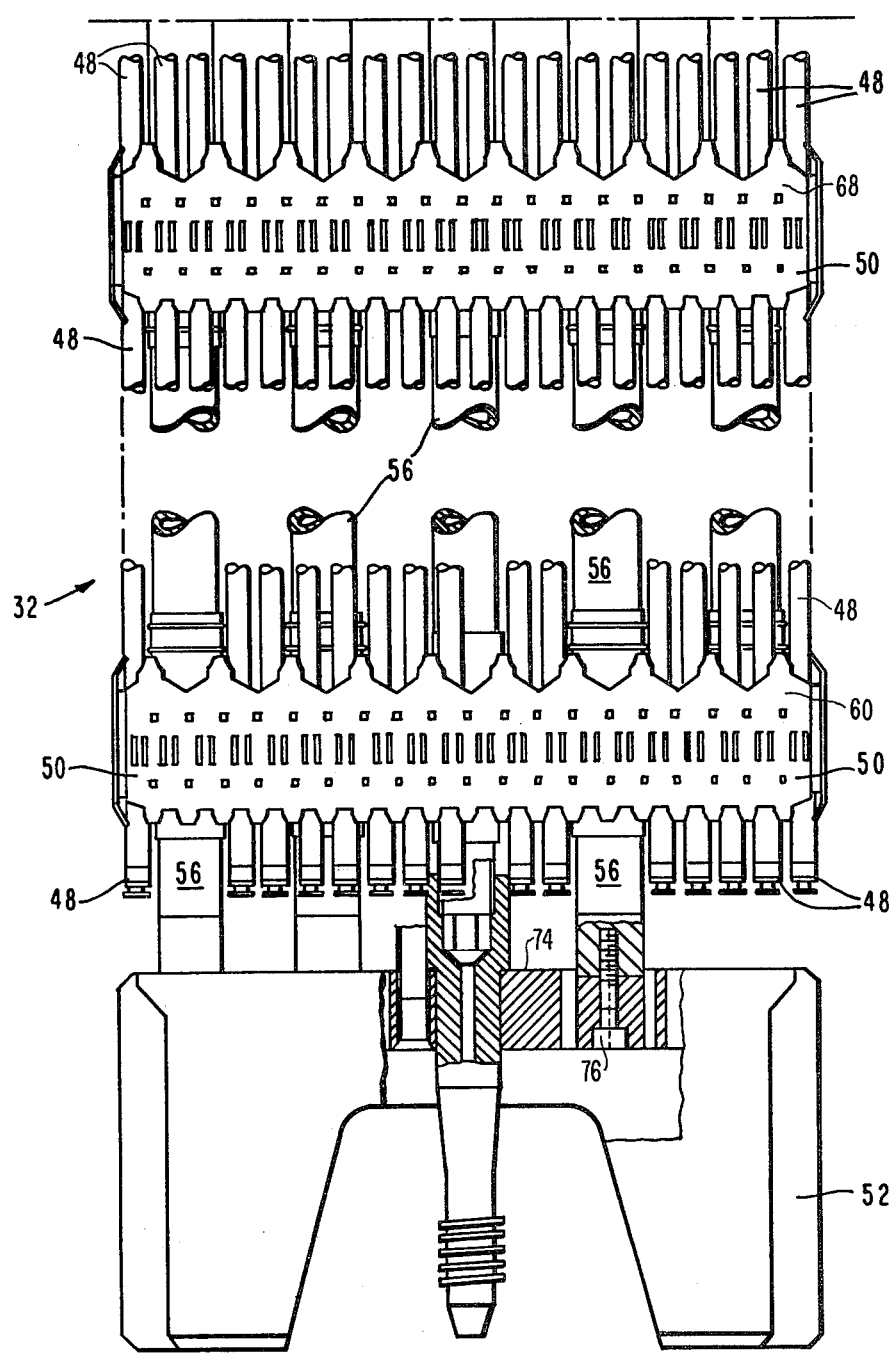
FIG. 3 is a cross-sectional view in elevation of the bottom portion of the fuel assembly.

Referring to FIG. 1, the nuclear reactor is referred to generally as 20 and comprises a reactor vessel 22 with a removable closure head 24 attached to the top end thereof. An inlet nozzle 26 and an outlet nozzle 28 are connected to reactor vessel 22 to allow a coolant such as water to circulate through reactor vessel 22. A core plate 30 is disposed in the lower portion of reactor vessel 22 and serves to support fuel assemblies 32. Fuel assemblies 32 are arranged in reactor vessel 22 and comprise reactor core 34. As is well understood in the art, fuel assemblies 32 generate heat by nuclear fissioning of the uranium therein. The reactor coolant flowing through reactor vessel 22 in heat transfer relationship with fuel assemblies 32 transfers the heat from fuel assemblies 32 to electrical generating equipment located remote from nuclear reactor 20. A plurality of control rod drive mechanisms 36 which may be chosen from those well known in the art are disposed on closure head 24 for inserting or withdrawing control rods (not shown) from fuel assemblies 32. In addition, a plurality of displacer rod drive mechanisms 38 are also disposed on closure head 24 for inserting or withdrawing displacer rods 40 from fuel assemblies 32. Displacer rod drive mechanism 38 may be similar to the one described in copending U.S. patent application Ser. No. 217,055, filed Dec. 16, 1980 in the name of L. Veronesi et al. entitled "Hydraulic Drive Mechanism" and assigned to the Westinghouse Electric Corporation. For purposes of clarity, only a selected number of displacer rods 40 are shown in FIG. 1. However, it should be understood, that the number of displacer rods 40 are chosen to correspond to the number of displacer rod guide tubes in fuel assemblies 32. Displacer rods 40 are elongated cylindrical substantially hollow rods which may be of the type disclosed in copending United States Patent Application Ser. No. 217,052 entitled "Displacer Rod For Use In A Mechanical Spectral Shift Reactor" filed Dec. 16, 1980 in the name of R. K. Gjersten et al. and assigned to the Westinghouse Electric Corporation. Displacer rods 40 are arranged so as to be in colinear alignment with the guide tubes in fuel assemblies 32 so that displacer rods 40 may be inserted therein when it is desired. The insertion of displacer rods 40 into fuel assemblies 32 displaces water-moderator from core 34 which reduces core moderation. A plurality of displacer rod guide structures 42 are located in the upper section of reactor vessel 22 with each being in alignment with a displacer rod drive mechanism 38 for guiding the movement of displacer rods 40 through the upper section of reactor vessel 22. A calandria 44 may be arranged between fuel assemblies 32 and displacer rod guide structures 42 and comprises a multiplicity of hollow stainless steel tubes arranged in colinear alignment with each displacer rod and control rod for providing guidance of the displacer rods and control rods through the calandria area and for minimizing flow induced vibrations in the displacer rods and control rods.

Referring now to FIGS. 2–5, fuel assemblies 32 comprise fuel elements 48, grids 50, bottom nozzle 52, top nozzle 54, and guide tubes 56. Fuel elements 48 may be elongated cylindrical metallic tubes containing nuclear fuel pellets and having both ends sealed by end plugs. Fuel elements 48 may be arranged in a substantially 20×20 rectangular array and are held in place by grids 50. When held by grids 50, fuel elements 58 may be arranged in a 0.470 inch square pitch to form a 9.40×9.40 inch square fuel assembly. Guide tubes 56 which may number 25 are arranged in a generally 5×5 array within each fuel assembly 32. Each guide tube 56 occupies the space of about four fuel elements 48 and extend from bottom nozzle 52 to top nozzle 54 and provide a means to support grids 50, top nozzle 54 and bottom nozzle 52. Guide tubes 56 may be hollow cylindrical metallic tubes manufactured from a metal such as Zircaloy tubing and capable of accommodating rods such as displacer rods 40 or control rods. Guide tubes 56 may have openings in the sides or in the bottom ends thereof for allowing reactor coolant to pass therethrough for cooling purposes. Displacer rods 40 and control rods are manufactured to be approximately the same size so that each guide tube 56 can equally accommodate either a displacer rod or a control rod. When not occupied by a rod, guide tubes 56 are filled with reactor coolant; however, when displacer rods 40 are inserted in guide tubes 56 displacer rods 40 displace the coolant therein.

Grids 50 which may number about 12 per fuel assembly are positioned at various locations along the length of fuel assembly 32 and serve to space fuel elements 48 and guide tubes 56 at appropriate distances from each other and to allow the reactor coolant to circulate in heat transfer relationship with fuel elements 48. A more detailed description of grids similar to grids 50 may be found in U.S. Pat. Nos. 3,379,617 and 3,379,619. The grid 50 located closest to top nozzle 54 is referred to as top grid 58 and the grid 50 located closest to bottom nozzle 52 is referred to as bottom grid 60 with the ten grids 50 located therebetween being referred to as intermediate grids 62. Both top grid 58 and bottom grid 60 may be of the well-known spring-dimple type and may be made of Inconel for providing greater lateral support for fuel elements 48 when the grids are irradiated. Intermediate grids 62 may be of the dimple-type grids with no spring clips and made of Zircaloy for providing greater flow area for the reactor coolant.

Figure 4:
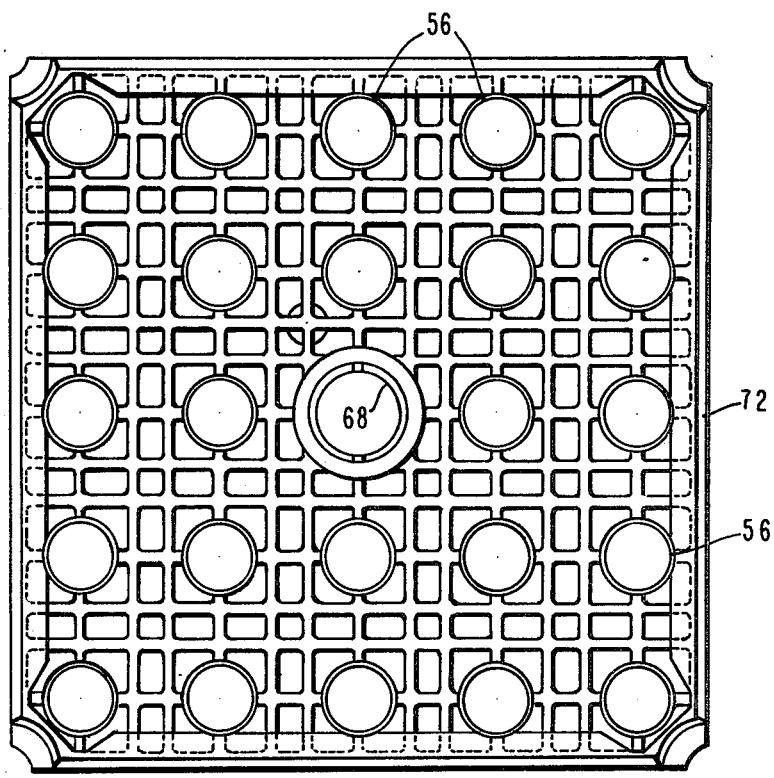
FIG. 4 is a top view of an adapter plate.
Figure 5:
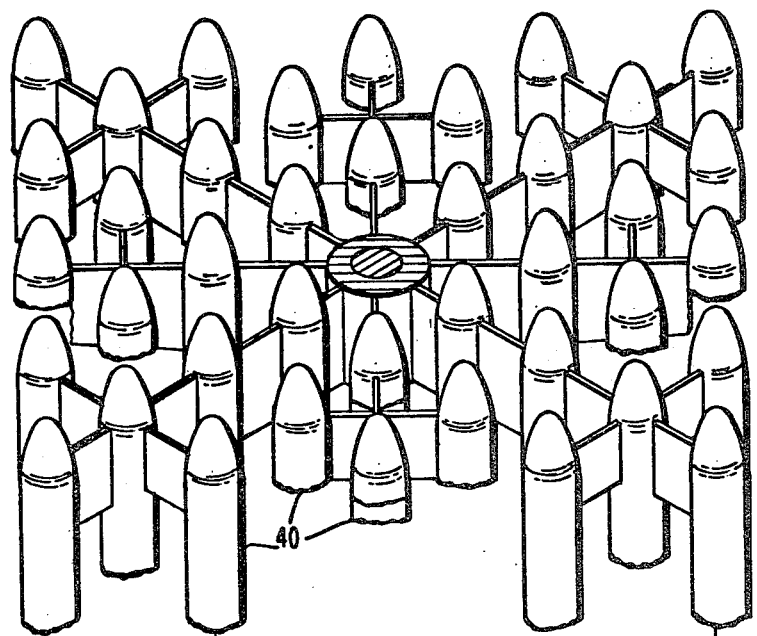
FIG. 5 is a view in perspective of displacer rods and their respective fuel assembly.
Figure 5:
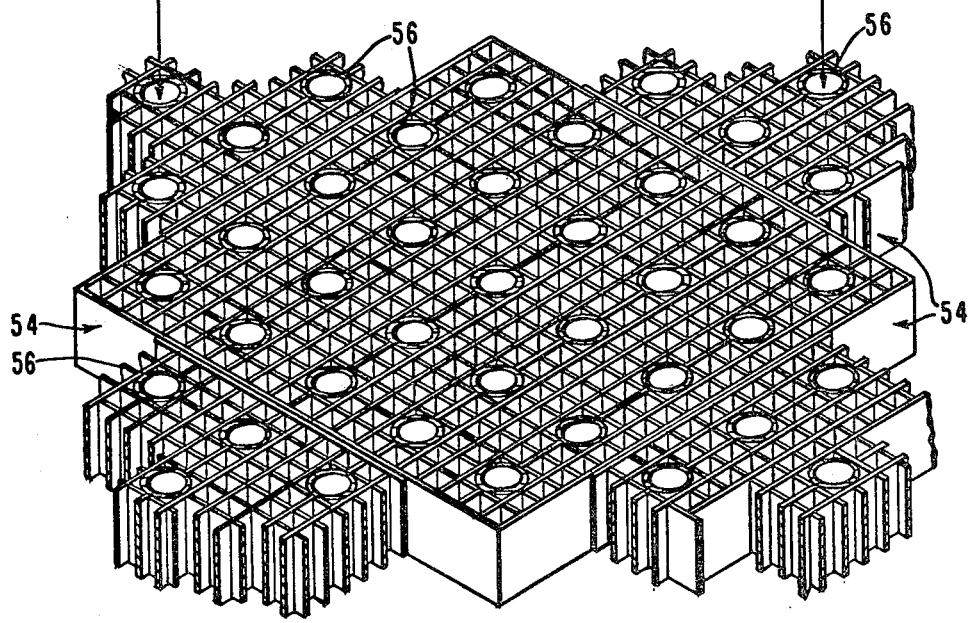

Twenty-four stainless steel sleeves 64 are brazed to each top grid 58 and each bottom grid 60 and twenty-four Zircaloy sleeves 66 are welded to each intermediate grid 62. All guide tubes 56 except center guide tube 68 are mechanically attached by internal bulging to each grid 50. Having twenty-four guide tubes 56 attached to all twelve grids 50 produces a fuel assembly with significantly greater lateral stiffness than most existing fuel assemblies. Additionally, twenty-four stainless steel sleeves 70 are welded to each top adapter plate 72 which forms part of top nozzle 54. Each top adapter plate 72 may be constructed as shown in FIG. 5 but are preferably formed as shown in FIG. 4. Stainless steel sleeves 70 are welded to each adapter plate 72 by four axial welds. A bottom adapter plate 74 which may be similar to top adapter plate 72 forms part of bottom nozzle 52. A plurality of stainless steel screws 76 penetrate through bottom adapter plate 74 and are used to attach guide tubes 56 to bottom nozzle 52. Screws 76 may also have a channel therethrough for allowing the reactor coolant to enter the guide tubes for cooling purposes. A locking pin (not shown) may be used to secure screws 76 to bottom adapter plate 74 by welding the pin to bottom adapter plate 74. As an alternative, a locking cup (not shown) may be used to secure screws 76.

Figure 6:
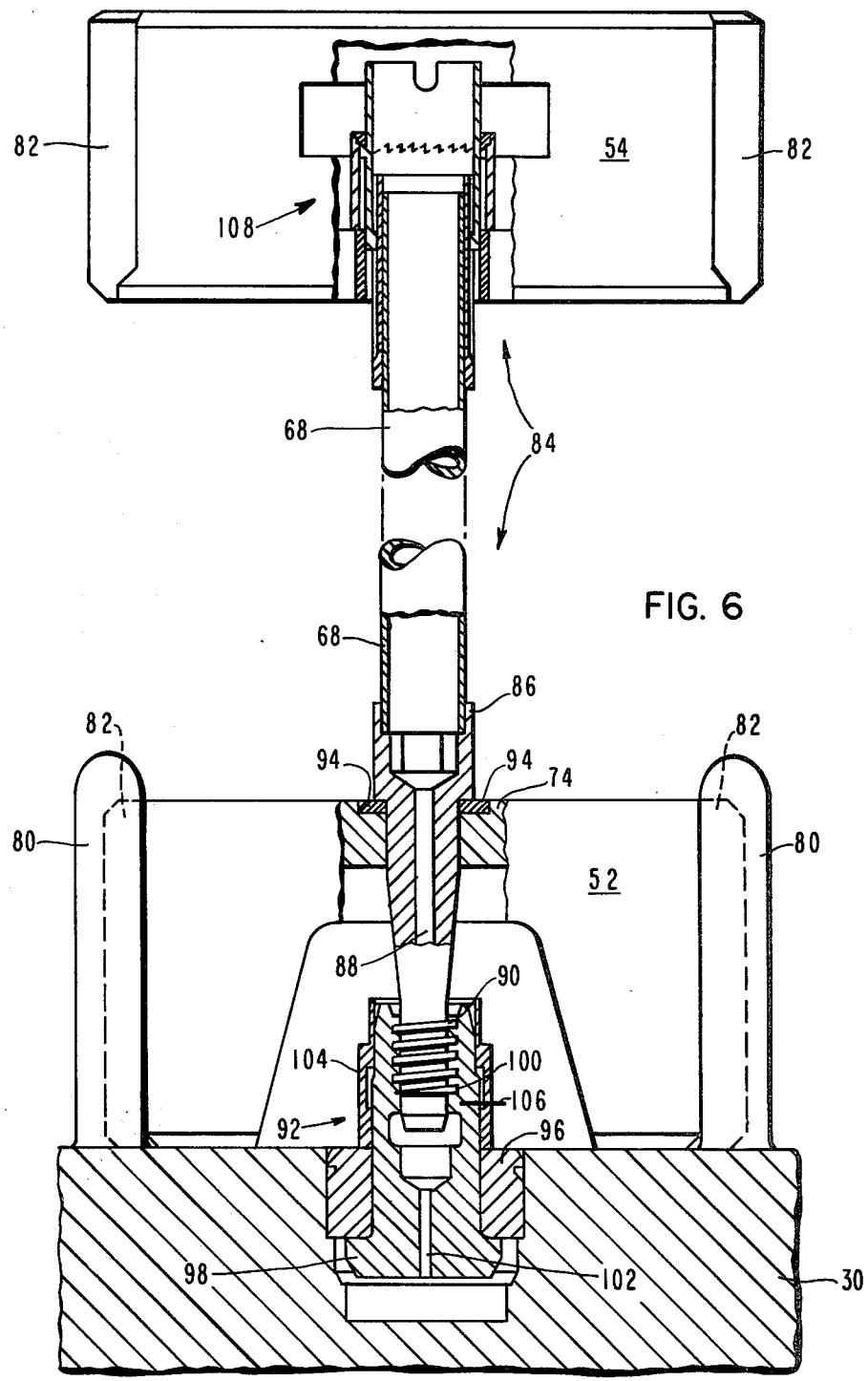
FIG. 6 is a partial cross-sectional view in elevation of a fuel assembly.
Figure 7:
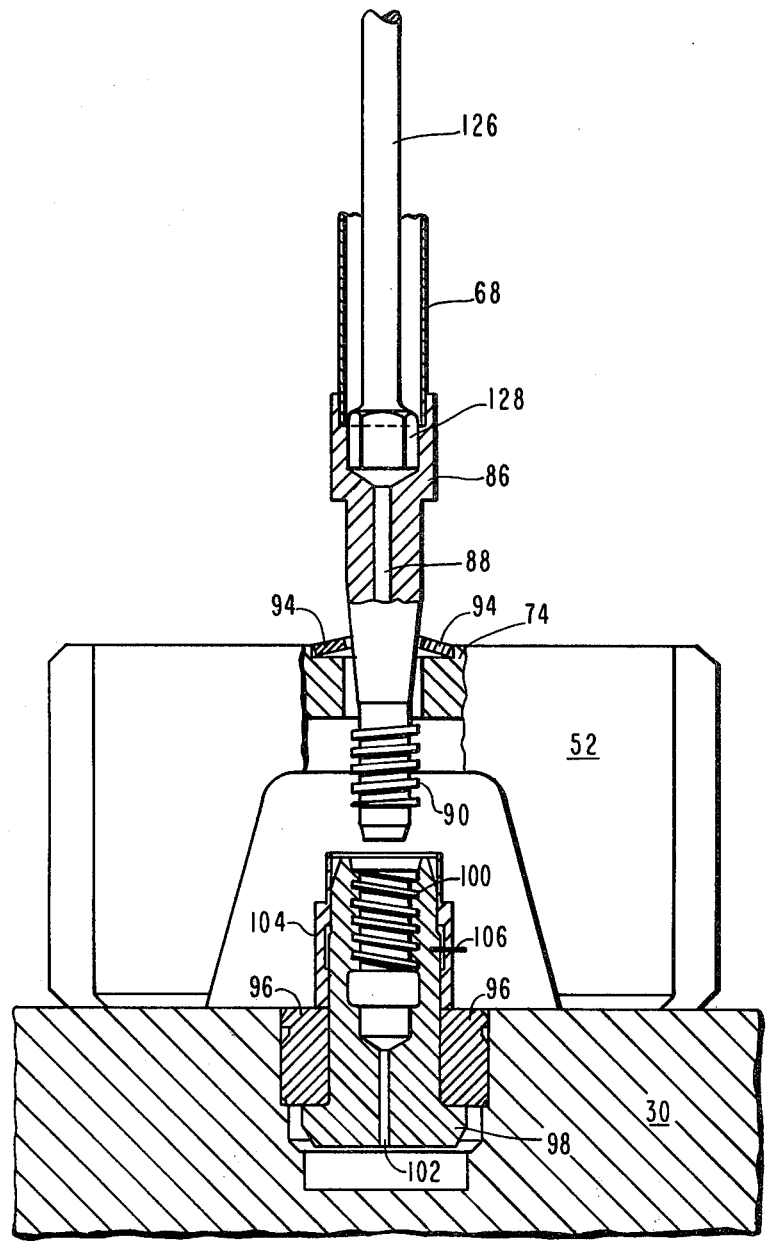
FIG. 7 is a partial cross-sectional view in elevation of the lower portion of a fuel assembly.
Figure 8:
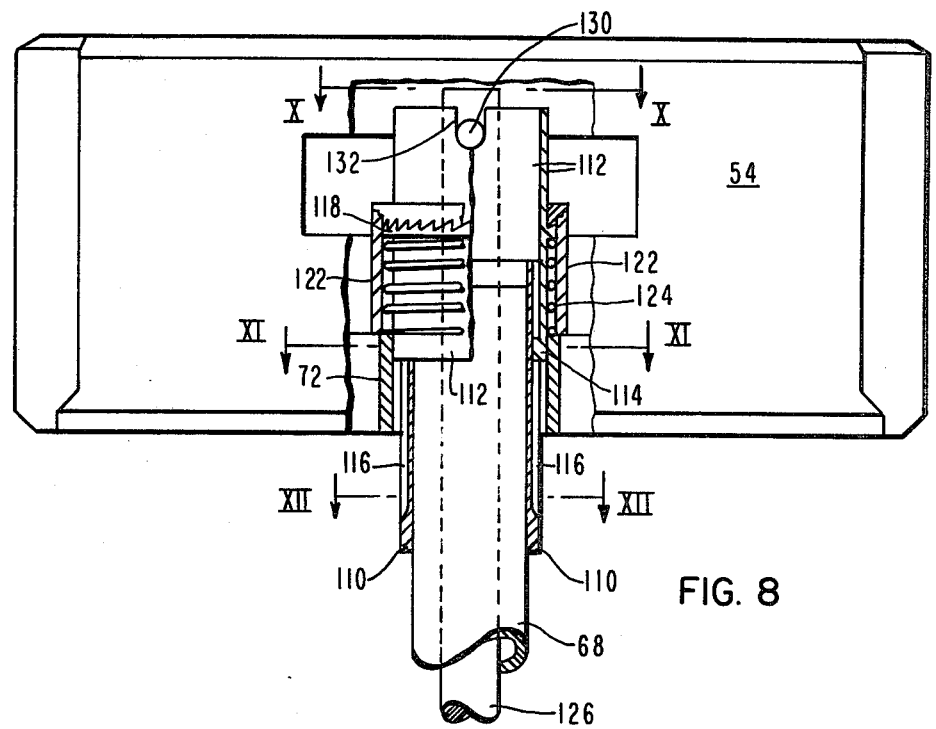
FIGS. 8 and 9 are partial cross-sectional views in elevation of the top portion of a fuel assembly.

Referring now to FIG. 6, core plate 30 has a plurality of guide pins 80 mounted thereon that are formed to fit into semi-circular notches 82 of bottom nozzle 52. Guide pins 80 are arranged to fit into four adjacent fuel assembly notches 82 so as to provide alignment of fuel assemblies 32 on core plate 30. Similarly, top nozzle 54 may also have semi-circular notches 82 for accommodating such guide pins from a top core plate (not shown) if so desired.

Referring now to FIGS. 6–12, a fuel assembly locking mechanism 84 is provided in each fuel assembly 32 for removably attaching each fuel assembly to core plate 30 thereby eliminating the need for holddown springs that were used in the prior art. For clarity the fuel assemblies shown in FIGS. 6–12 have been simplified; however, it should be understood that these fuel assemblies are identical to those shown in FIGS. 2–4. Thus, all fuel assemblies 32 may be provided with a locking mechanism 84. Locking mechanism 84 comprises a stainless steel lower member 86 which is slidably disposed in the center of bottom adapter plate 74. Lower member 86 has a first bore 88 therein for allowing reactor coolant to pass therethrough and has external threads 90 around the outside of its lower portion for engaging anchor mechanism 92. A Belleville spring washer 94 is disposed in a notch in bottom adapter plate 74 and is compressed when lower member 86 is forced downwardly relative to bottom adapter plate 74 as shown in FIG. 6. Spring washer 94 prevents loss of axial preload due to small unlocking rotation of external threads 90.

Anchor mechanism 92 comprises a stainless steel lower anchor 96 which may be screw attached or welded to core plate 30. A removable insert 98 is captured and held by lower anchor 96. Insert 98 may be made of an antigalling and wear-resistant, austenitic, stainless steel and is provided with internal threads 100 for engaging external threads 90 thereby locking lower member 86 to core plate 30. Insert 98 may also have a second bore 102 therein for allowing reactor coolant to pass therethrough and into first bore 88 of lower member 86. A locking collar 104 may be provided with internal threads (not shown) that mate with external threads (not shown) on insert 98 so that locking collar 104 may be screwed onto insert 98 thereby pulling both insert 98 and locking collar 104 into tight contact with lower anchor 96. In addition, a locking pin 106 may be provided for locking insert 98 to locking collar 104 thereby preventing inadvertent unlocking of the two members.

Center guide tube 68 which may be made of Zircaloy is bulged attached to lower member 86 and extends into top nozzle 54. A ratchet mechanism 108 is attached to the top center guide tube 68 for locking center guide tube 68 to top nozzle 54. Ratchet mechanism 108 comprises a slotted member 110 that is welded to the upper end of center guide tube 68. A slider member 112 having lugs 114 on its inner surface is slidably disposed over slotted member 110 such that lugs 114 are slidably disposed in slots 116 of slotted member 110. This arrangement allows axial movement but not rotation of slider member 112 relative to slotted member 110. Slider member 110 also has a first set of ratchet teeth 118 mounted around the outside thereof. A second set of ratchet teeth 120 are mounted on retainer housing 122 in a manner so as to mate with first set of ratchet teeth 118. Retainer housing 122 is disposed around slider member 112 and is attached to top adapter plate 72 so that slider member 112 may slide relative to retainer housing 122. A biasing mechanism 124 which may be a coil spring is disposed between top adapter plate 72 and first set of ratchet teeth 118 and around slider member 112 for urging slider member 112 upwardly thus moving first set of ratchet teeth 118 into contact with second set of ratchet teeth 120. A turning key 126 which may be a long metal member having an hexagonal head 128 on the lower end thereof may be inserted through center guide tube 68 for screwing external threads 90 into internal threads 100. Turning key 126 may also have a crossbar 130 on the top end thereof that is capable of being disposed in groove 132 of slider member 112.

Figure 9:
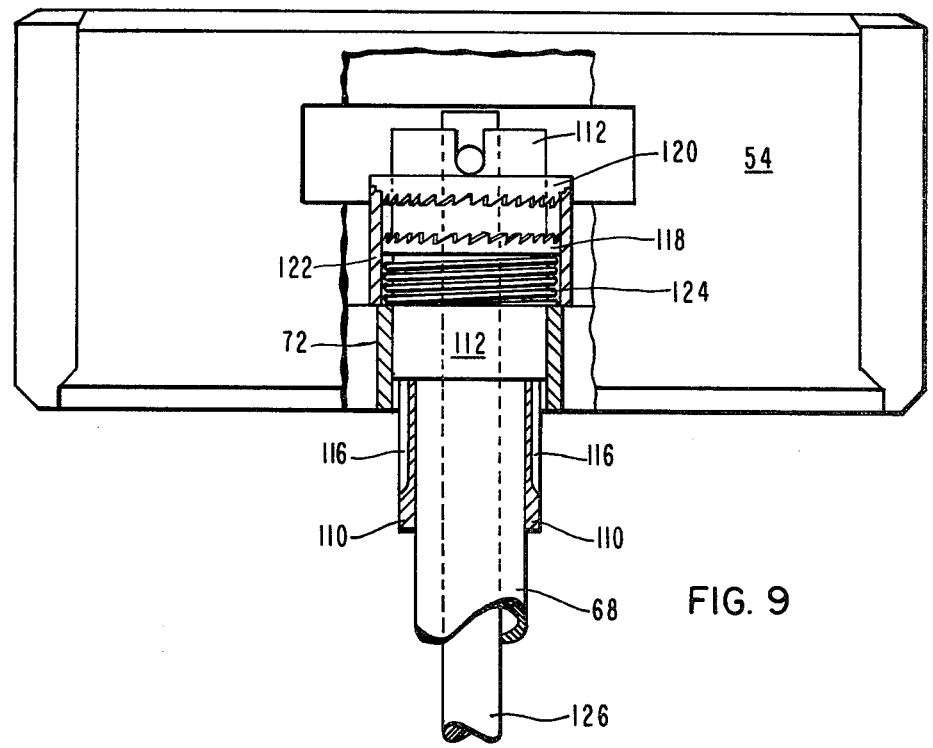
Figure 10:
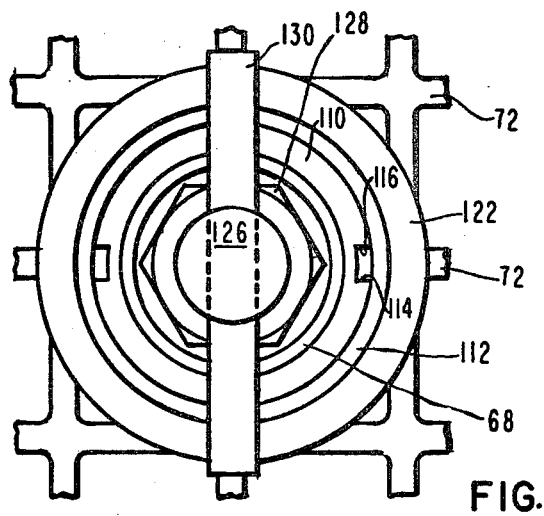
FIG. 10 is a view along line X—X of FIG. 8.
Figure 11:
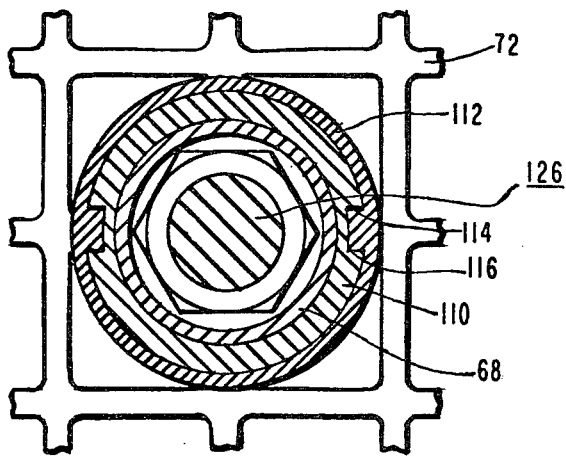
FIG. 11 is a view along line XI—XI of FIG. 8.
Figure 12:
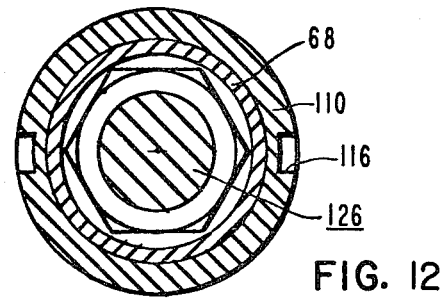
FIG. 12 is a view along line XII—XII of FIG. 8.

When it is desired to lock a fuel assembly 32 to core plate 30, turning key 126 may be inserted into center guide tube 68 so that crossbar 130 is disposed in groove 132 and head 128 is disposed in lower member 86. Since center guide tube 68 is not firmly attached to top adapter plate 72, center guide tube 86 is free to rotate and slide relative to top adapter plate 72 but may not be removed therefrom because of the interaction of slotted member 110 and slider member 112. So turning key 126 may be used to push lower member 86 into contact with lower adapter plate 74 and to turn external threads 90 into internal threads 100 thus locking fuel assembly 32 to core plate 30. Since first set of ratchet teeth 118 is arranged to override second set of ratchet teeth 120, it is not necessary to depress slider member 112 in order to engage external threads 90 and internal threads 100. However, when it is necessary to unlock lower member 86 from anchor mechanism 92, it is necessary to depress slider member 112 thereby compressing biasing mechanism 124 and disengaging first set of ratchet teeth 118 from second set of ratchet teeth 120. When slider member 112 has been thus depressed as shown in FIG. 9, slider member 112 can be held in this position and rotated so as to release lower member 86 from anchor mechanism 92 thereby unlocking the fuel assembly from core plate 30. Since top nozzle 54 is connected to retainer housing 122 by means of top adapter plate 72 and to bottom adapter plate 74 by means of guide tubes 56, when first set of ratchet teeth 118 is engaged with second set of ratchet teeth 120 fuel assembly 32 is locked onto core plate 30 and cannot be unlocked until the ratchet teeth are disengaged.

Therefore, the invention provides a fuel assembly that is capable of being locked to the core plate of a nuclear reactor.

I claim:
1. A fuel assembly for a nuclear reactor comprising:
   a top nozzle;
   a bottom nozzle;
   a plurality of fuel elements containing nuclear fuel disposed between said top nozzle and said bottom nozzle;
   a guide tube extending from said top nozzle to said bottom nozzle;
   a lower member attached to the lower end of said guide tube and having external threads thereon for engagement the core plate of said nuclear reactor thereby attaching said fuel assembly to said core plate; and locking means attached to said top nozzle for preventing disengagement of said external threads.

2. The fuel assembly according to claim 1 wherein said locking means comprises:

a slider member having first teeth thereon and slidably disposed on said guide tube; and a retainer housing having second teeth thereon and attached to said top nozzle, said first teeth and said second teeth being arranged to prevent rotation of said guide tube when engaged.

3. The fuel assembly according to claim 2 wherein said locking means further comprises biasing means for urging said second teeth into engagement with said first teeth.

4. The fuel assembly according to claim 3 wherein said locking means further comprises a slotted member attached to said guide tube and in contact with said slider member for preventing rotation of said slider member with respect to said guide tube but allowing said slider member to slide relative to said slotted member.

5. The fuel assembly according to claim 4 wherein said second teeth are arranged to override said first teeth when it is desired to engage said lower member to said core plate.

6. The fuel assembly according to claim 5 wherein said second teeth are arranged to prevent said second teeth from overriding said first teeth for preventing disengagement of said lower member from said core plate.

7. The fuel assembly according to claim 6 wherein said fuel assembly further comprises a spring washer disposed on said bottom nozzle near said lower member for preventing loss of axial preload on said guide tube when said spring washer is compressed.

8. The fuel assembly according to claim 7 wherein said guide tube is rotatably and slidably disposed in said top nozzle.

9. The fuel assembly according to claim 8 wherein said lower member is a stainless steel member and said guide tube is a Zircaloy member.

10. The fuel assembly according to claim 9 wherein said biasing means is a coil spring.

* * * * *